United States Patent
Teraoka et al.

(10) Patent No.: US 8,596,958 B2
(45) Date of Patent: Dec. 3, 2013

(54) CROSS-FLOW FAN AND AIR CONDITIONER EQUIPPED WITH SAME

(75) Inventors: Hironobu Teraoka, Sakai (JP); Shimei Tei, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 550 days.

(21) Appl. No.: 12/937,545

(22) PCT Filed: Apr. 30, 2009

(86) PCT No.: PCT/JP2009/058447
§ 371 (c)(1),
(2), (4) Date: Oct. 13, 2010

(87) PCT Pub. No.: WO2009/136584
PCT Pub. Date: Nov. 12, 2009

(65) Prior Publication Data
US 2011/0033307 A1 Feb. 10, 2011

(30) Foreign Application Priority Data

May 9, 2008 (JP) ................................. 2008-123448
Mar. 10, 2009 (JP) ................................. 2009-056969

(51) Int. Cl.
*F04D 5/00* (2006.01)
*F04D 29/38* (2006.01)

(52) U.S. Cl.
USPC ................... 415/53.1; 416/236 R; 416/223 R

(58) Field of Classification Search
USPC ......... 415/53.1; 416/178, 187, 223 R, 231 B, 416/235, 223 B, 236 R
See application file for complete search history.

(56) References Cited

U.S. PATENT DOCUMENTS

2009/0028719 A1    1/2009   Teraoka et al.

FOREIGN PATENT DOCUMENTS

| JP | 3-210093 A | 9/1991 | |
| JP | 3-210094 A | 9/1991 | |
| JP | 03210093 A * | 9/1991 | ............... F04D 17/04 |
| JP | 03210094 A * | 9/1991 | ............... F04D 17/04 |
| JP | 10-252689 A | 9/1998 | |
| JP | 11-141494 A | 5/1999 | |
| JP | 2006-125390 A | 5/2006 | |
| JP | 2008-2378 A | 1/2008 | |
| WO | WO 2007037216 A1 * | 4/2007 | ............... F04D 17/04 |
| WO | WO 2007/114090 A1 | 10/2007 | |
| WO | WO 2007114090 A1 * | 10/2007 | ............... F04D 17/04 |

\* cited by examiner

*Primary Examiner* — Nathaniel Wiehe
*Assistant Examiner* — Aaron Jagoda
(74) *Attorney, Agent, or Firm* — Birch, Stewart, Kolasch & Birch, LLP

(57) ABSTRACT

A crossflow fan includes an impeller formed by plate-like blades 42. Each blade 42 is inclined such that the outer edge 42a is located on the leading side of the inner edge 42d with respect to the rotation direction of the impeller 41. The face of each blade 42 that is located on the leading side of the rotation direction forms a positive pressure surface 42p, and a face located on the trailing side forms a negative pressure surface 42q. Notches 42b are formed at the outer edge 42a of the blade 42. The notches 42b are arranged at predetermined intervals along the rotation axis of the impeller. A basic shape section 42c is formed between each adjacent pair of the notches 42b. The blade thickness L2 in the vicinity of the bottom 42y of each notch 42b is smaller than the blade thickness of the basic shape section 42c adjacent to the notch 42b.

11 Claims, 15 Drawing Sheets

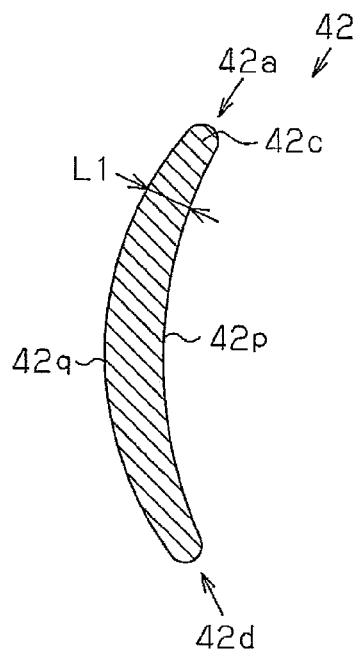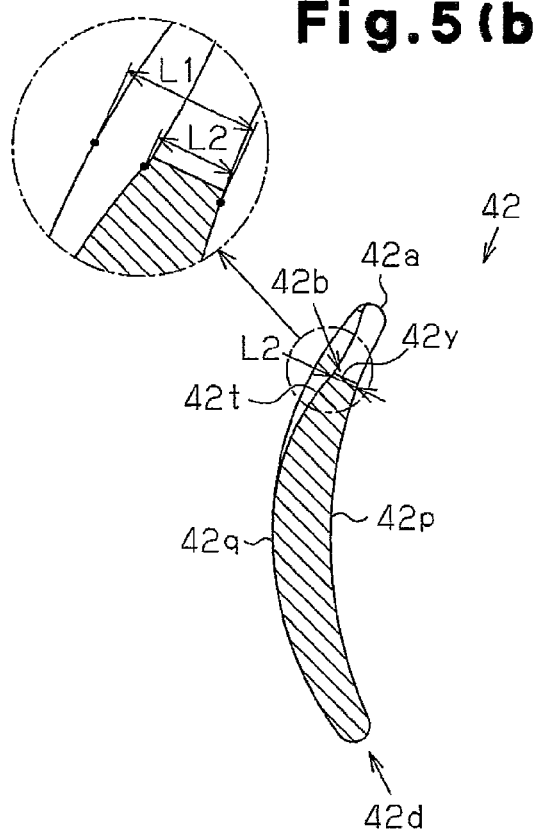
Fig.5(a)  Fig.5(b)
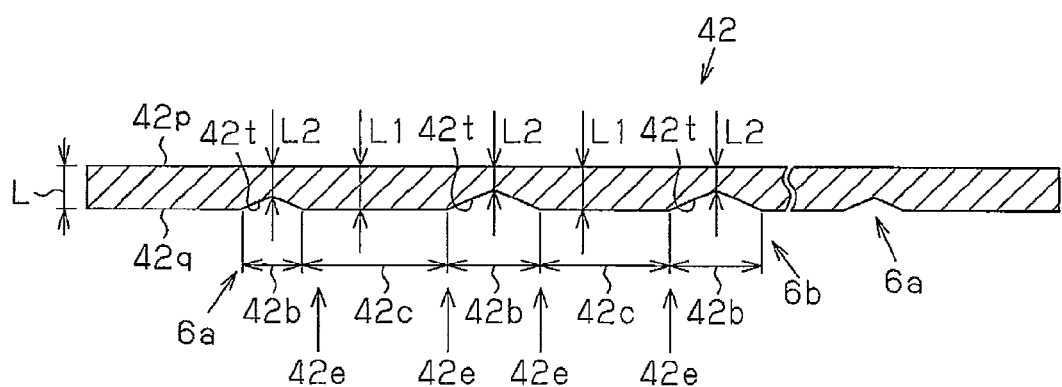
Fig.6

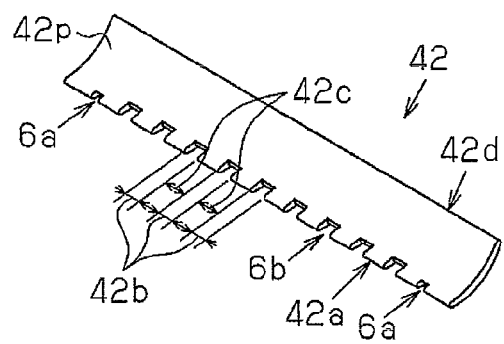
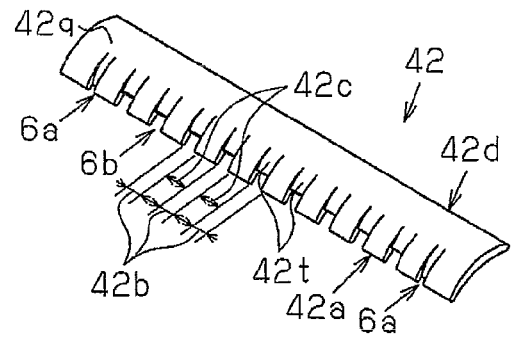
Fig.14(a)   Fig.14(b)
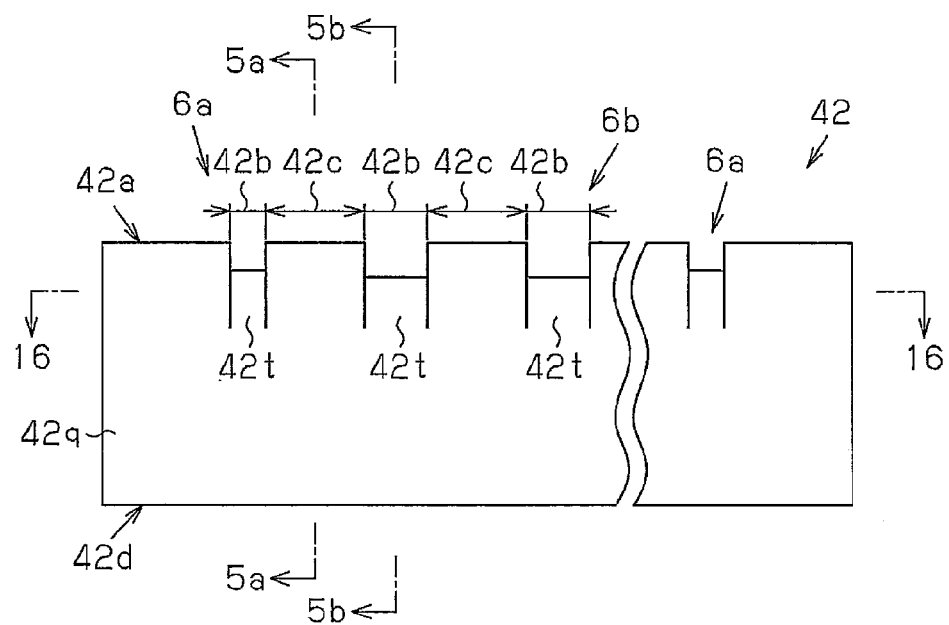
Fig.15

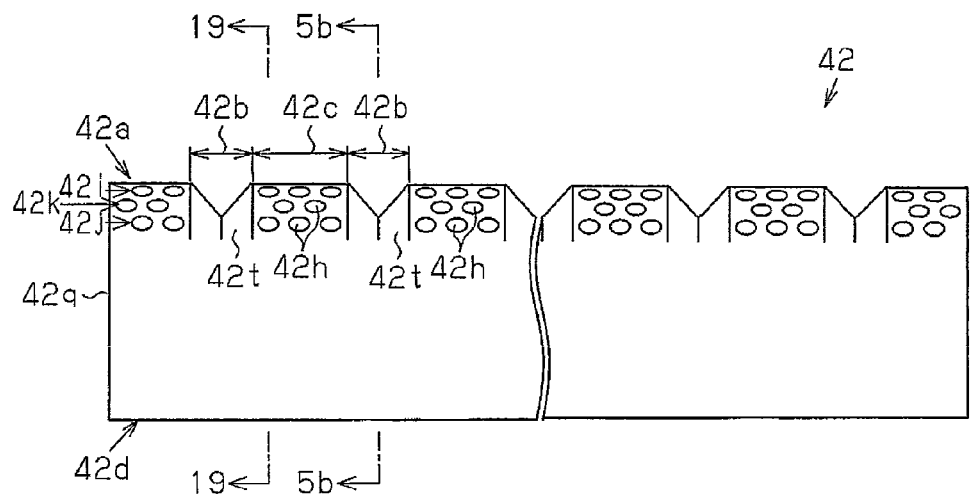
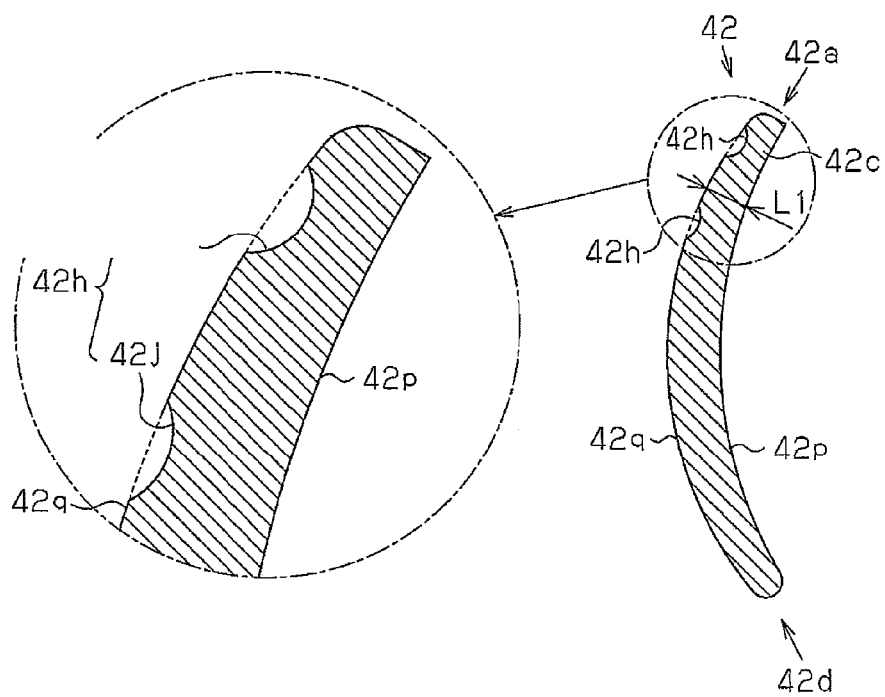

CROSS-FLOW FAN AND AIR CONDITIONER EQUIPPED WITH SAME

TECHNICAL FIELD

The present invention relates to a crossflow fan and an air conditioner having the crossflow fan.

BACKGROUND ART

Crossflow fans are known as air blowers as used in an indoor unit of a wall-mounted air conditioner. FIG. 22 shows one example of a crossflow fan. As shown in FIG. 22, a crossflow fan 104 is a type of fan through which air flow crosses transversely, and includes an impeller 141 formed by a number of blades 142. The blades 142 are forward-swept blades, in each of which the outer edge is located on the leading side from the inner edge with respect to the rotation direction Z1. When the impeller 141 is rotated in the rotation direction Z1 by an electric motor, cooled or heated air flow X (that is, conditioned air flow) in an indoor unit 1 of the air conditioner transversely passes through the impeller 141, in a plane perpendicular to the rotation axis Z of the impeller 141.

In the impeller of such a crossflow fan, air passing through the blades of the impeller generates noise. In an attempt to reduce such noise with a simple structure, crossflow fans have been proposed that have a plurality of notches formed at an edge of each blade (for example, see Patent Document 1). FIGS. 23 and 24 show a blade used in such a crossflow fan. As shown in FIGS. 23 and 24, a plurality of notches 242b are formed at an outer edge 242a of a plate-like blade 242. A basic shape section 242c is formed between each adjacent pair of the notches 242b. As shown in FIG. 25, the bottom 242y of each notch 242b extends in a direction substantially perpendicular to the sides of the blade 242. The blade thickness L6 in the vicinity of the bottom 242y of the notch 242b is equal to a blade thickness L5 of the basic shape section 242c. The notches 242b, which are formed in the blade 242 as described above, reduce trailing vortices (not shown) generated at an outlet region M of a crossflow fan 204. In other words, a simple modification to the shape of the blade 242 effectively reduces the noise of the crossflow fan 204.

Patent Document 1: Japanese Laid-Open Patent Publication No. 2006-125390

DISCLOSURE OF THE INVENTION

Problems that the Invention is to Solve

As described in Patent Document 1, a simple structure where notches are formed at an edge of each blade can effectively reduce noise. However, when employed, this structure increases air resistance against rotation of the impeller 241. Specifically, when notches 242b are formed at the outer edge 242a of each blade 242 as shown in FIG. 26, rotation of the impeller 241 causes air flow X to strike the bottom 242y of each notch 242b, which extends perpendicularly to both sides of the blade 242. Thus, compared to a case where no notches are formed at the outer edge 242a, collision of the air flow X generates greater air resistance against rotation of the impeller 241 at an inlet region N of the crossflow fan 204. As a result, to ensure a sufficient volume of discharged air from the crossflow fan 204, the power output of the electric motor, which drives the crossflow fan 204, needs to be increased.

Accordingly, it is an objective of the present invention to provide a crossflow fan that prevents the power output required from an electric motor driving the crossflow fan from being increased, and an air conditioner having the crossflow fan.

Means for Solving the Problems

To achieve the foregoing objective and in accordance with one aspect of the present invention, a crossflow fan is provided that includes an impeller having a plurality of support plates located on a rotation axis of the impeller and a plurality of plate-like blades provided at peripheral portions of the support plates. The blades extend parallel to the rotation axis. Each blade is inclined such that its outer edge is located on the leading side of its inner edge with respect to the rotation direction of the impeller. One of the faces of each blade that is on the leading side of the rotation direction of the impeller forms a positive pressure surface. The face on the trailing side of the rotation direction forms a negative pressure surface. A plurality of notches are formed at at least one of the inner edge and the outer edge of each blade. The notches are arranged at predetermined intervals along the rotation axis of the impeller. A basic shape section is formed between each adjacent pair of the notches. A blade thickness in the vicinity of the bottom of each notch is less than the blade thickness of the adjacent basic shape section.

According to this configuration, the notches are formed at at least one of the inner edge and the outer edge of each blade, and are arranged at predetermined intervals along the rotation axis of the impeller. Also, a basic shape section is formed between each adjacent pair of the notches. Thus, noise is effectively reduced by a simple structure. Further, since the blade thickness in the vicinity of the bottom of each notch is less than the blade thickness of the basic shape section, collision loss at the entry of air flow into the notch is reduced. As a result, the power output required from the electric motor driving the crossflow fan can be reduced. In the above, the predetermined intervals may be the same intervals or may vary according to the position in the longitudinal direction of the blade.

In the present invention, it is preferable that: the notches be formed at the outer edge of each blade; a plurality of grooves be formed on at least one of the positive pressure surface and the negative pressure surface, the grooves extending from the outer side toward the inner side of the blade and corresponding to the notches, so that the blade thickness in the vicinity of the bottom of each notch is less than the blade thickness of the adjacent basic shape section; and the blade thickness of a part of the blade corresponding to each groove gradually increase from the bottom of the notch toward the inner edge of the blade.

According to this configuration, parts of the blade that correspond to the grooves are each formed in such a manner that its blade thickness gradually increases from the bottom of the notch toward the inner edge of the blade. Thus, a part that is inside of the groves on the positive pressure surface or the negative pressure surface of each blade and the bottoms of the notches are smoothly connected to each other by the surfaces of the grooves. Therefore, on the inlet side of the crossflow fan, air flow that flows into the notches from the outer side of the blade in such a manner as to resist the rotation of the impeller is allowed to flow smoothly into the impeller along the positive pressure surface or the negative pressure surface. This reduces the collision loss generated when air flows in from outside of the blade. As a result, the increased power output required from the electric motor driving the crossflow fan caused by the formation of the notches in the blades can be effectively reduced.

In the present invention, it may be configured so that: the notches are formed at the inner edge of each blade; a plurality of grooves are formed on at least one of the positive pressure surface and the negative pressure surface, the grooves extending from the inner side toward the outer side of the blade and corresponding to the notches, so that the blade thickness in the vicinity of the bottom of each notch is less than the blade thickness of the adjacent basic shape section; and the blade thickness of a part of the blade corresponding to each groove gradually increases from the bottom of the notch toward the outer edge of the blade.

According to this configuration, parts of the blade that correspond to the grooves are each formed in such a manner that its blade thickness gradually increases from the bottom of the notch toward the outer edge of the blade. Thus, a part that is outside of the groves on the positive pressure surface or the negative pressure surface of each blade and the bottoms of the notches are smoothly connected to each other by the surfaces of the grooves. Therefore, air that flows into the notches from the inner side of the blade is allowed to flow smoothly out of the impeller along the positive pressure surface or the negative pressure surface. This reduces the collision loss generated when air flows in from inside of the blade. As a result, required increased power output from the electric motor driving the crossflow fan caused by the formation of the notches in the blades can be effectively reduced. In a case where notches and corresponding grooves are formed at both of the outer edge and the inner edge of each blade, collision loss is reduced while effectively reducing noise compared to a case where notches and grooves are formed only at one of the outer edge and the inner edge of each blade. Accordingly, the increased power output required from the electric motor driving the crossflow fan is further suppressed.

According to the present invention, it is preferable that the notches be V-shaped as viewed from the negative pressure surface and the positive pressure surface of the blade; each groove be formed to be gradually shallower from the center toward both sides in the widthwise direction; and the blade thickness continuously changes from the groove toward the adjacent basic shape section.

According to this configuration, since the notch is V-shaped as viewed from the negative pressure surface and the positive pressure surface, a greater pressure receiving area of the blade is ensured compared to a case where the notch has rectangular shape. Each groove, which corresponds to a notch, is formed so as to be gradually shallower from the center toward both sides in the widthwise direction, and the blade thickness continuously changing from the groove toward the adjacent basic shape section. Thus, no step is formed between a groove corresponding to a notch and an adjacent basic shape section along the longitudinal direction of the blade. Compared to a case where a step is formed between each notch and the corresponding basic shape section, air flow is disturbed by a smaller degree. Accordingly, increase in power output required from the electric motor driving the crossflow fan is suppressed further.

In the present invention, it is preferable that the positive pressure surface maintain the basic shape, and the grooves be formed on the negative pressure surface.

According to this configuration, the basic shape of the positive pressure surface is maintained, while the grooves corresponding to the notches are formed on the negative pressure surface. Compared to a case where grooves corresponding to notches are formed on the positive pressure surface, pressure applied to air flow is increased.

In the present invention, a structure for controlling a turbulent boundary layer is preferably provided on the negative pressure surface of each blade. The turbulent boundary layer controlling structure changes the boundary layer for air flow formed in the vicinity of the negative pressure surface from laminar flow to turbulent flow, thereby preventing air flowing onto the blade from separating from the blade.

According to this configuration, a turbulent boundary layer controlling structure (for example, dimples, grooves or other rough surface), which changes the boundary layer the air flow from laminar to turbulent thereby preventing air flowing onto the blade from separating from the blade, is provided on the negative pressure surface. Thus, the boundary layer on the negative pressure surface of the blade can be changed from laminar to turbulent flow. This prevents the air flow at the boundary layer from decelerating, thereby preventing air flowing onto the blade from separating from the blade. Particularly, when notches are formed at an edge of the blade, air flow that has lost its two-dimensionality (that is, air flow having three-dimensionality) flows onto the blade. Thus, a turbulent boundary layer controlling structure such as dimples, which have changing cross-sectional shapes, or an irregular rough surface, effectively prevents air flowing onto the blade from separating. As a result, pressure resistance acting on the blade is reduced, and the power driving the crossflow fan can be reduced compared to a case where no turbulent boundary layer controlling structure is provided.

In the present invention, the turbulent boundary layer controlling structure is preferably provided in the basic shape section formed between notches.

According to this configuration, since the turbulent boundary layer controlling structure is formed in the basic shape section between notches, dimples or grooves having desired depths are easily formed compared to a case where, for example, dimples or grooves serving as a turbulent boundary layer controlling structure are formed in a groove corresponding to a notch. That is, since the blade thickness of the basic shape section is great compared to that of the groove, sufficient depths are ensured for the dimples or grooves serving as the turbulent boundary layer controlling structure.

According to the present invention, the turbulent boundary layer controlling structure preferably includes dimples.

According to this configuration, since the turbulent boundary layer controlling structure, which changes the boundary layer of air flow from laminar flow to turbulent flow, air flowing onto the blade is highly effectively prevented from separating compared to a case where the turbulent boundary layer controlling structure is grooves formed along the direction of air. That is, if the turbulent boundary layer controlling structure is dimples, shearing force produced at the bottom of the boundary layer can be reduced by changing the boundary layer from laminar flow to turbulent flow and creating a secondary flow in the dimples. Therefore, air flowing onto the blade is more effectively prevented from separating from the blade.

In the present invention, the dimples are preferably formed in the vicinity of the outer edge of the negative pressure surface of the blade and along the air flow direction, and the depths of the dimples preferably become shallower from the outer edge toward the inner edge of the blade.

According to this configuration, the depths of the dimples formed in the vicinity of the outer edge of the blade becomes shallower toward the inner edge. Thus, dimples further away from the outer edge of the blade have smaller depths than dimples close to the outer edge. Development of a boundary layer is not effectively suppressed at the outer edge. As described above, the dimples have different depths. Thus, in dimples further away from the outer edge, loss caused by secondary air flow is reduced. Compared to a case where the dimples have the same depths, the power output of the electric motor driving the crossflow fan can be reduced. Only some of the dimples formed in the vicinity of the outer edge may have depths that decrease toward the inner edge. Also, all the dimples may have depths that decrease toward the inner edge.

Alternatively, the dimples may be formed in the vicinity of the inner edge of the negative pressure surface of the blade and along the air flow direction, and the depths of the dimples may become shallower from the inner edge toward the outer edge of the blade.

According to this configuration, the depths of the dimples formed in the vicinity of the inner edge of the blade becomes shallower toward the outer edge. Thus, dimples further away from the inner edge of the blade have smaller depths than dimples close to the inner edge. Development of a boundary layer is not effectively suppressed at the inner edge. As described above, the dimples have different depths. Thus, in dimples further away from the inner edge, loss caused by secondary air flow is reduced. Compared to a case where the dimples have the same depths, the power output of the electric motor driving the crossflow fan can be reduced. Only some of the dimples formed in the vicinity of the inner edge may have depths that decrease toward the outer edge. Also, all the dimples may have depths that decrease toward the outer edge.

Further, the present invention also provides an air conditioner having a crossflow fan having the above described configuration.

Effects of the Invention

According to the present invention, the notches are formed at at least one of the inner edge and the outer edge of each blade, and are arranged at predetermined intervals along the rotation axis of the impeller. Also, a basic shape section is formed between each adjacent pair of the notches. Thus, noise is effectively reduced by a simple structure. Further, since the blade thickness in the vicinity of the bottom of each notch is less than the blade thickness of the basic shape section, collision loss at the entry of air flow into the notch is reduced. As a result, the power output required from the electric motor driving the crossflow fan can be reduced.

BRIEF DESCRIPTION OF THE DRAWINGS

FIG. 5(a) is a cross-sectional view taken along line 5a-5a of FIG. 4;

FIG. 5(b) is a cross-sectional view taken along line 5b-5b of FIG. 4;

FIG. 6 is a cross-sectional view taken along line 6-6 of FIG. 4;

FIGS. 14(a) and 14(b) are perspective views showing an impeller blade of the crossflow fan according to a modified embodiment;

FIG. 15 is a diagram for explaining a blade with notches according to a modified embodiment;

FIG. 18 is a diagram for explanatory illustration of a blade of the modified embodiment of FIG. 17;

FIG. 19 is a cross-sectional view taken along line 19-19 of FIG. 18.

BEST MODE FOR CARRYING OUT THE INVENTION (First Embodiment)

A first embodiment of the present invention will now be described with reference to FIGS. 1 to 8.

Figure 1:
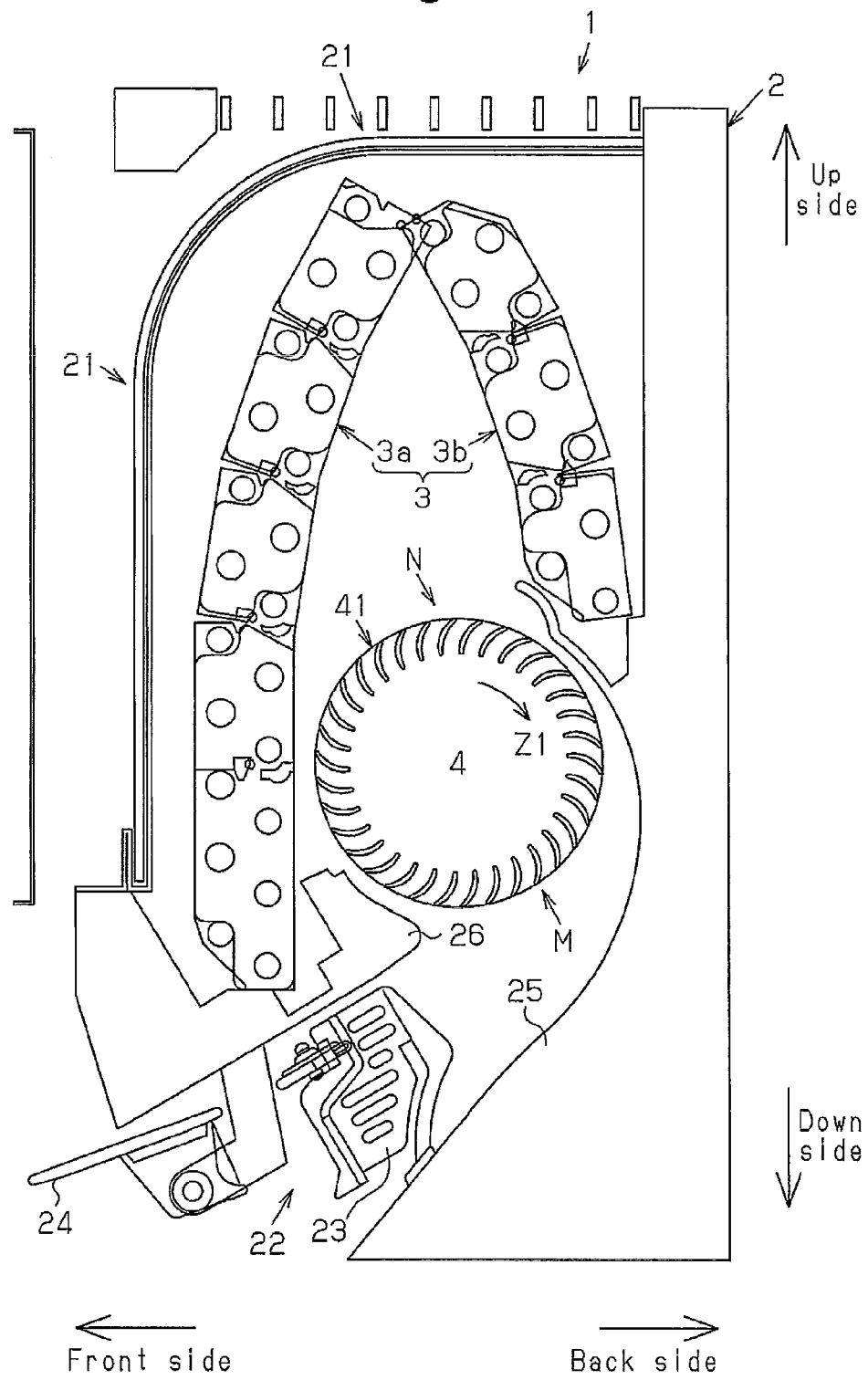
FIG. 1 is schematic diagram showing an indoor unit of an air conditioner having a crossflow fan according to a first embodiment of the present invention.

As shown in FIG. 1, an air conditioner according to the present embodiment includes a wall-mounted indoor unit 1. The indoor unit 1 includes a main casing 2, a heat exchanger 3 arranged in the main casing 2, and a crossflow fan 4. The crossflow fan 4 has an impeller 41 having plate-like blades 42. The impeller 41 is driven by an electric motor (not shown) to compress and send air from an inlet region N to an outlet region M.

Air inlet ports 21 are provided in upper and front face of the main casing 2. An air outlet port 22 is provided in a lower face of the main casing 2. At the air outlet port 22, vertical flaps 23 and a horizontal flap 24 for adjusting the direction of air discharged from the air outlet port 22 are provided.

A guide portion 25 is formed in the main casing 2 at a position in the vicinity of the outlet region M of the crossflow fan 4. The guide portion 25 defines the passage of air discharged by the crossflow fan 4. A backflow preventing tongue 26 is formed at the air outlet port 22. The backflow preventing tongue 26 separates the outlet region M and the inlet region N from each other, thereby preventing discharged air from flowing back.

The heat exchanger 3 is located between the air inlet port 21 and the impeller 41, and formed by a front heat exchanging section 3a and a back heat exchanging section 3b. The front heat exchanging section 3a is located in the main casing 2 near the front face. The back heat exchanging section 3b is continuously formed at the top of the front heat exchanging section 3a, and is located in the main casing 2 near the back face.

According to the above shown structure, when the impeller 41 of the crossflow fan 4 is driven by the electric motor, air in the room is drawn in to the main casing 2 through the inlet port 21. The air is cooled or heated by passing through the heat exchanger 3, and is discharged into the room through the air outlet port 22. Accordingly, conditioned air is delivered to the room.

Figure 2:
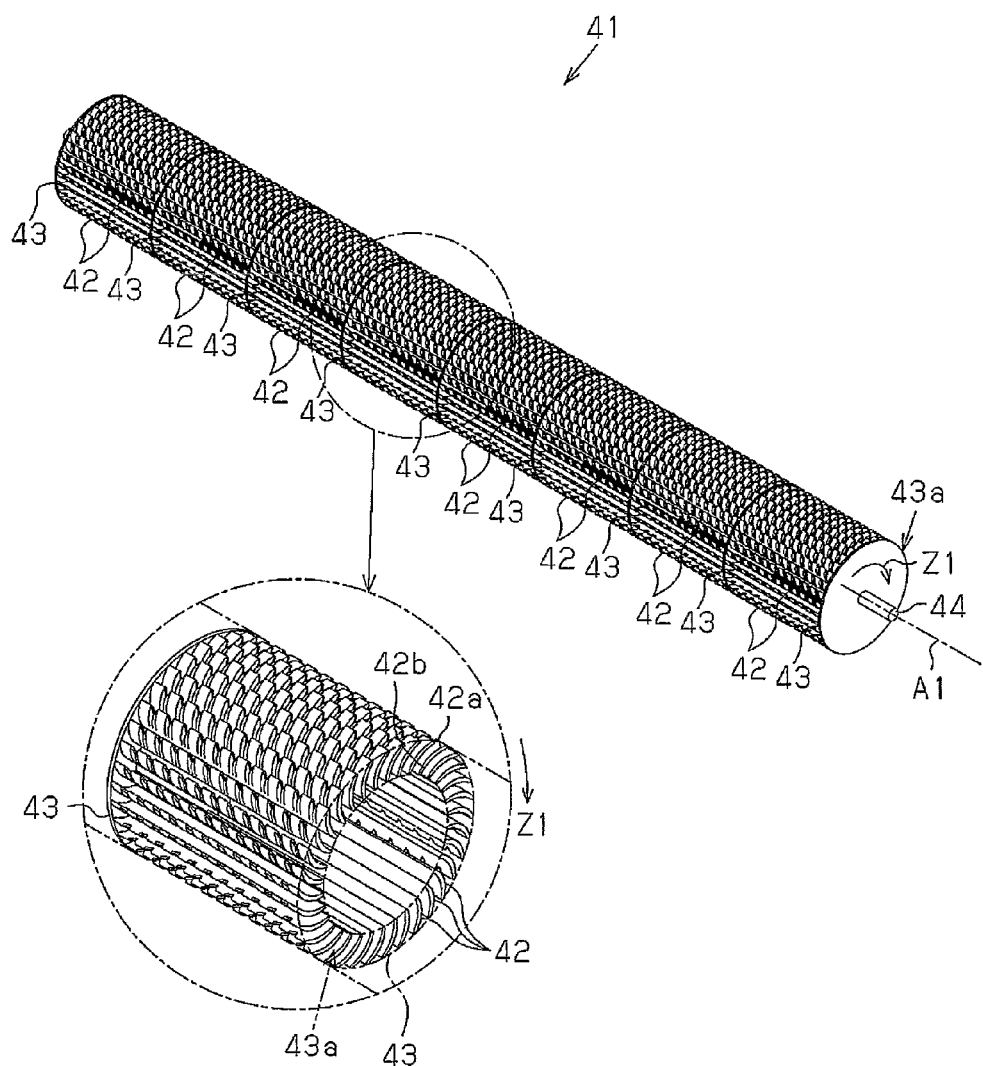
FIG. 2 is a perspective view showing the crossflow fan according to the first embodiment.

As shown in FIG. 2, the impeller 41 of the crossflow fan 4 is formed by a great number of the blades 42, circular support plates 43, and an input shaft 44. The support plates 43 support the blades 42 and are located on the rotation axis A1 of the impeller 41. The input shaft 44 is connected to the electric motor and extends along the rotation axis A1. The support plates 43 are arranged parallel to each other at predetermined intervals along the rotation axis A1 of the impeller 41, or the longitudinal direction of the blades 42. The blades 42 are fixed to peripheral portions 43a of the support plates 43 and arranged between adjacent two support plates 43 to extend parallel to the rotation axis A1.

Figure 3A:
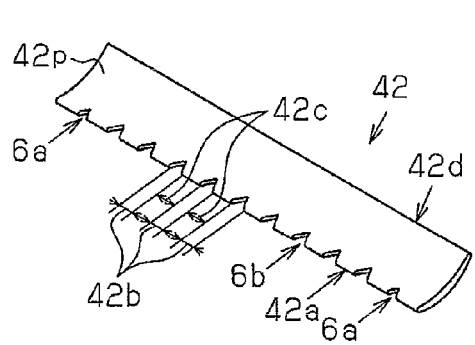
FIGS. 3(a) and 3(b) are perspective views showing an impeller blade of the crossflow fan according to the first embodiment.
Figure 3B:
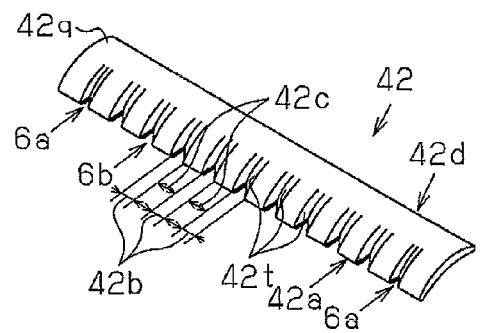

The structure of each blade 42 will be described with reference to FIGS. 3 and 4. As shown in FIG. 2, the blades 42 are forward-swept. That is, each blade 42 is inclined such that the outer edge 42a is located on the leading side of the inner edge 42d with respect to a rotation direction Z1 of the impeller 41. As shown in FIGS. 2 and 3, the face of each blade 42 that is located on the leading side of the rotation direction Z1 forms a positive pressure surface 42p, and a face located on the trailing side forms a negative pressure surface 42q. The blade 42 is also curved such that the outer edge 42a is located on the leading side of the inner edge 42d with respect to the rotation direction Z1 of the impeller 41.

Notches 42b are formed at the outer edge 42a of the blade 42. The notches 42b are arranged at predetermined intervals along the rotation axis A1 of the impeller 41. The notches 42b are V-shaped when viewed from the negative pressure surface 42q and the positive pressure surface 42p of the blade 42. A basic shape section 42c is formed between each adjacent pair of the notches 42b. The basic shape sections 42c form the curved basic shape of the blade 42.

The width of the space between adjacent notches 42b may be constant or may vary. For example, as shown in FIGS. 3 and 4, each end 6a of the blade 42 with respect to the rotation axis A1 is close to the corresponding support plate 43. Thus, the flow velocity of air flow X at each end 6a is greater than that in a center 6b of the blade 42 in the rotation axis A1. In the present embodiment, the space between notches 42b at each end 6a of the blade 42 is greater than the space between notches 42b at the center 6b of the blade 42. This ensures a sufficient pressure receiving area at each end 6a of the blade 42.

The notches 42b may have the same size, but may have different sizes depending on position on the rotation axis A1. In the present embodiment, notches 42b at each end 6a of the blade 42 in the rotation axis A1 have a smaller size than notches 42b at the center 6b of the blade 42. This ensures a sufficient pressure receiving area at each end 6a of the blade 42.

Figure 4:
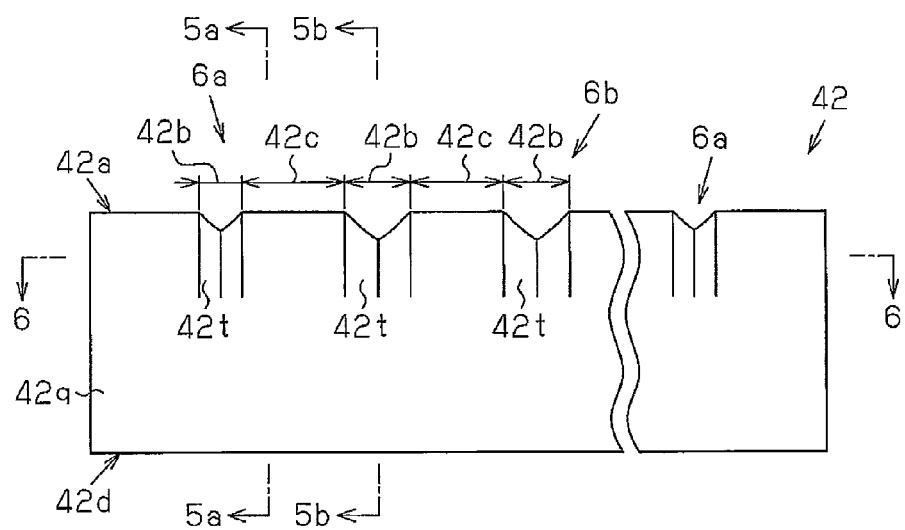
FIG. 4 is a diagram for explanatory illustration of a blade in which notches according to the first embodiment are formed.

As described above, the notches 42b formed at the outer edge 42a of the blade 42 at predetermined intervals, and the basic shape sections 42c are each formed between adjacent notches 42b as shown in FIG. 4. This reduces trailing vortices (not shown) generated at the outlet region M of the crossflow fan 4, so that noise is reduced with a simple structure.

The notches 42b are V-shaped when viewed from the negative pressure surface 42q and the positive pressure surface 42p of the blade 42. Thus, compared to a case where notches 42b have rectangular shapes, the pressure receiving area of the blade 42 is enlarged.

FIG. 5(a) is a cross-sectional view of the blade 42 taken along line 5a-5a of FIG. 4, and FIG. 5(b) is a cross-sectional view taken along line 5b-5b of FIG. 4. FIG. 6 is a cross-sectional view the blade 42 taken along line 6-6 of FIG. 4. As shown in FIGS. 5(a) and 5(b), the width of a bottom 42y of each notch 42b in the direction of the thickness of the blade 42, that is, a blade thickness L2 in the vicinity of the bottom 42y is smaller (that is, thinner) than a blade thickness L1 of the basic shape section 42c adjacent to the notch 42b.

More specifically, as shown in FIGS. 3 to 6, while the basic shape of the positive pressure surface 42p is unchanged, grooves 42t extending from the outer side of the blade 42 toward the inner side each correspond to one of the notches 42b are formed on the negative pressure surface 42q of the blade 42. Since the grooves 42t are formed on the negative pressure surface 42q, the blade thickness L2 in the vicinity of the bottom 42y in the direction of the thickness of the blade 42 is smaller than the blade thickness L1 of the basic shape section 42c adjacent to the notch 42b. In this manner, the blade thickness L of the cross section along the longitudinal direction of the blade 42 varies.

Figure 7:
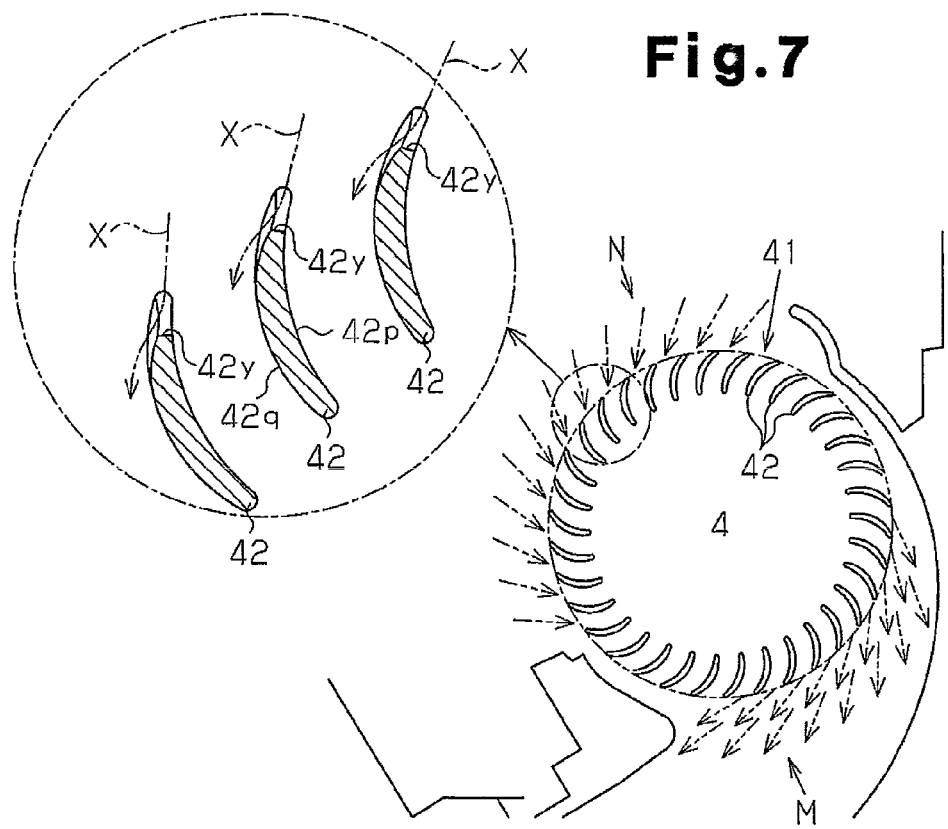
FIG. 7 is a diagram for explanatory illustration of a flow of air into the notches according to the first embodiment.

This configuration reduces the blade thickness in the vicinity of the bottom 42y of each notch 42b. Therefore, as shown in FIG. 7, collision loss at the entry of air flow X into the notches 42b formed at the outer edge 42a is reduced.

As shown in FIGS. 3 and 5, a part of the blade 42 that corresponds to the grooves 42t is formed in such a manner that the blade thickness gradually increases from the blade thickness L, from the bottoms 42y of the notches 42b toward the inner edge 42d. That is, a part that is inside of the grooves 42t on the negative pressure surface 42q of the blade 42 and the bottoms 42y of the notches 42b are smoothly connected to each other by the surfaces of the grooves 42t.

Further, as shown in FIG. 6, the grooves 42t are formed to be gradually shallower from the center toward both ends along the longitudinal direction of the blade 42, that is, along the direction of the width of the grooves 42t. In other words, a part of the blade 42 that corresponds to the grooves 42t is formed in such a manner that the blade thickness L gradually increases from the center of each groove 42t toward both ends. Thus, in the longitudinal direction of the blade 42, that is, in the rotation axis A1 of the impeller 41, no step is formed at the boundary 42e between each groove 42t and the adjacent basic shape section 42c. The blade thickness L therefore continuously changes from the groove 42t to the adjacent basic shape section 42c.

The crossflow fan 4 according to the present embodiment has the following advantages.

Figure 8:
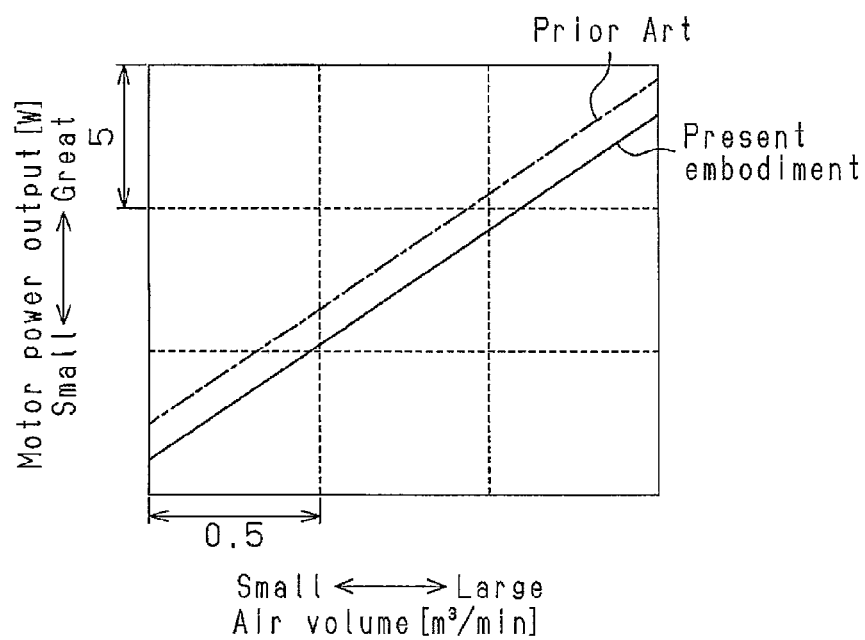
FIG. 8 is a graph for explanatory illustration of the effect of the crossflow fan according to the first embodiment.

(1) The notches 42b are formed at the outer edge 42a of each blade 42, and the blade thickness L2 in the vicinity of the bottom 42y of each notch 42b is smaller than the blade thickness L1 of the basic shape sections 42c. Therefore, in the inlet region N of the crossflow fan 42b, the structure reduces the collision loss generated when air flow X flows in from outside of the blades 42 into the notches 42b to act against rotation of the impeller 41. As a result, as shown in FIG. 8, the power output of the electric motor driving the crossflow fan 4 can be reduced compared to the power output of a prior art motor. That is, the required increased motor power output caused by formation of notches is suppressed. FIG. 8 is a characteristic graph showing the relationship between the air volume and the required motor power output for the crossflow fan 4 of the present embodiment and the prior art crossflow fan 204. In FIG. 8, the solid line shows the characteristics of the relationship between the air volume and the motor power output for the crossflow fan 4 of the present embodiment, and the alternate long and short dash line shows the characteristics of the relationship between the air volume and the motor power output for the prior art crossflow fan 204. The horizontal axis of FIG. 8 represents air volume, in which each grid unit of the scale corresponds to 0.5 m³/min. The vertical axis of FIG. 8 represents the required motor power output, in which each grid unit of the scale corresponds to 5 W.

(2) A part of the blade 42 that corresponds to the grooves 42t is formed in such a manner that the blade thickness gradually increases from the blade thickness L, from the bottoms 42y of the notches 42b toward the inner edge 42d. Therefore, a part that is inside of the groves 42t on the negative pressure surface 42q of the blade 42 and the bottoms 42y of the notches 42b are smoothly connected to each other by the surfaces of the grooves 42t. This allows the air flow X that flows into the notches 42b from outside of the blade 42 to flow smoothly along the negative pressure surface 42q and into the impeller 41. This reduces the collision loss generated when air flow X flows from outside of the blade 42 to the notches 42b. As a result, the increase in required power output of the electric motor for driving the crossflow fan 4 caused by the formation of the notches in the blades 42 can be effectively reduced.

(3) Each groove 42t is formed to be gradually shallower from the center toward both ends along the longitudinal direction of the blade 42, that is, along the direction of the width of the grooves 42t, or along the rotation axis of the impeller 41. In other words, a part of the blade 42 that corresponds to the grooves 42t is formed in such a manner that the blade thickness L gradually increases from the center of each groove 42t toward both ends. Therefore, along the longitudinal direction of the blade 42, no step is formed at the boundary 42e of the groove 42t, and the blade thickness L changes continuously. Thus, compared to a case where a step is formed at the boundary 42e between the groove 42t and the basic shape section 42c, the air flow X flowing in from the outside of the blade 42 is disturbed by a less degree. Accordingly, the increased power output required from the electric motor for driving the crossflow fan is suppressed further.

(4) The basic shape of the positive pressure surface 42p is maintained, while the grooves 42t are formed on the negative pressure surface 42q. Compared to a case where grooves corresponding to the notches 42b are formed on the positive pressure surface 42p, pressure applied to the air flow X is increased.

Also, the air conditioner of the present embodiment has the crossflow fan 4, which achieves the advantage (1) to (4). The air conditioner therefore achieves the same advantages as the advantages (1) to (4).

(Second Embodiment)

A second embodiment of the present invention will now be described. The overall structure of the air conditioner and the crossflow fan of the present embodiment are the same as those of the first embodiment, detailed description will be omitted.

Figure 9A:
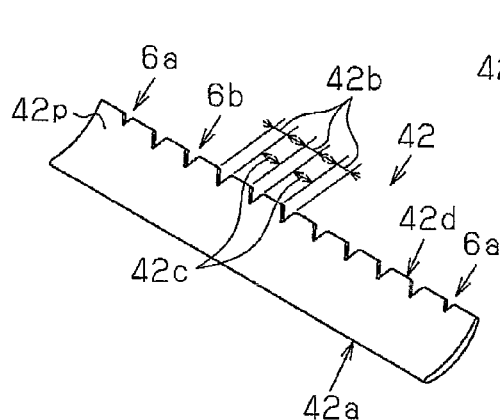
FIGS. 9(a) and 9(b) are perspective views showing an impeller blade of a crossflow fan according to a second embodiment of the present invention.
Figure 9B:
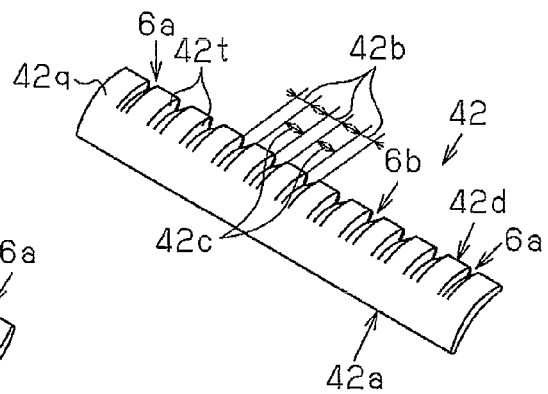
Figure 10:
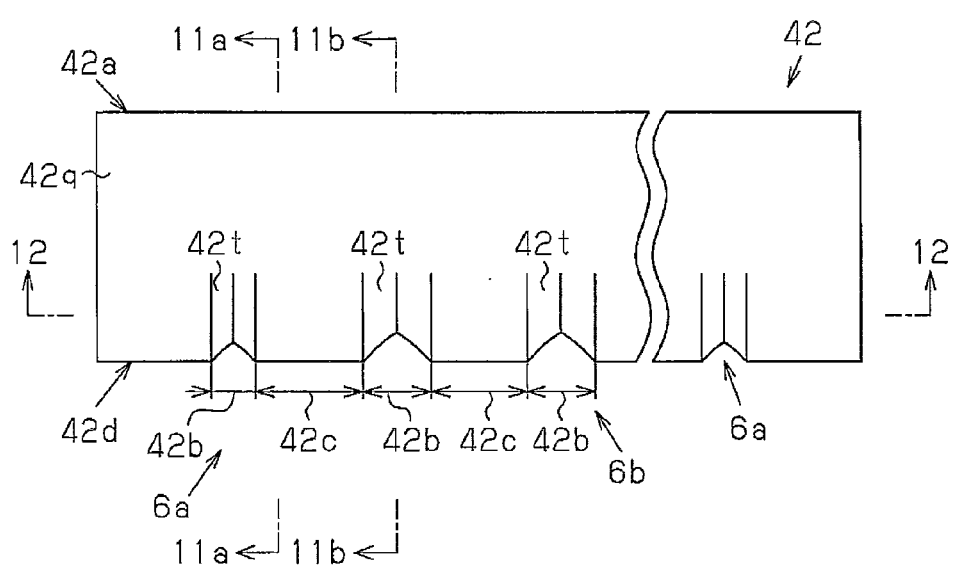
FIG. 10 is a diagram for explanatory illustration of a blade in which notches according to the first embodiment are formed.

In the present embodiment, as shown in FIGS. 9 and 10, notches 42b are formed at the inner edge 42d of the blade 42. The notches 42b are arranged at predetermined intervals along the rotation axis A1 of the impeller 41. The notches 42b are V-shaped when viewed from the negative pressure surface 42q and the positive pressure surface 42p of the blade 42. A basic shape section 42c is formed between each adjacent pair of the notches 42b. The basic shape sections 42c form the curved basic shape of the blade 42.

The basic shape sections 42c are notch-free sections where no notch is formed. The width of the space between adjacent notches 42b may be constant or may vary.

Figure 13:
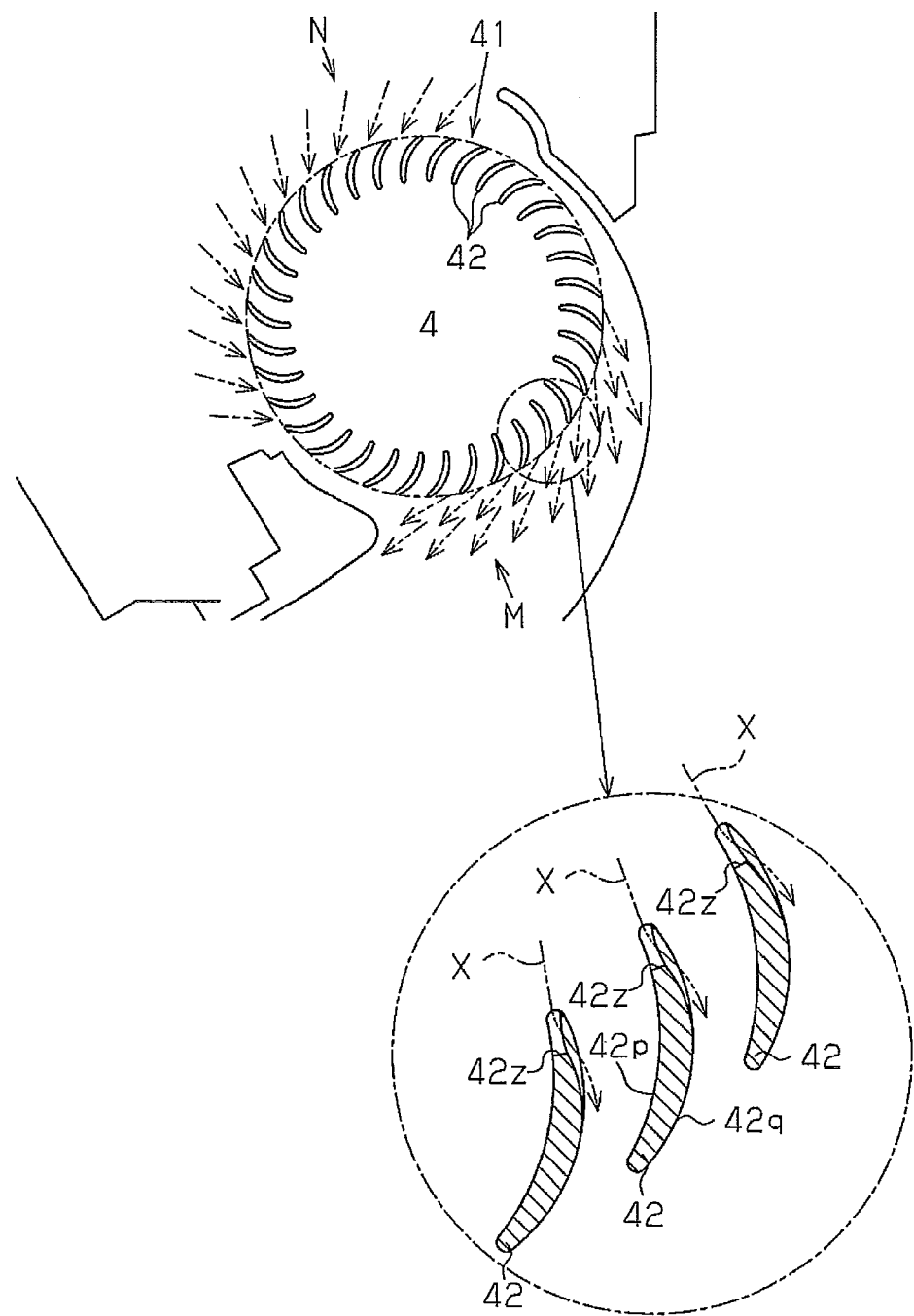
FIG. 13 is a diagram for explanatory illustration of a flow of air into the notches according to the first embodiment.

As described above, the notches 42b formed at the inner edge 42d of the blade 42 at predetermined intervals, and the basic shape sections 42c are each formed between adjacent notches 42b as shown in FIG. 13. This reduces trailing vortices (not shown) generated at the inlet region N of the crossflow fan 4, so that noise is reduced with a simple structure. The notches 42b are V-shaped when viewed from the negative pressure surface 42q and the positive pressure surface 42p of the blade 42. Thus, compared to a case where notches 42b have rectangular shapes, the pressure receiving area of the blade 42 is enlarged.

FIG. 11(a) is a cross-sectional view of the blade 42 taken along line 11a-11a of FIG. 10, and FIG. 11(b) is a cross-sectional view taken along line 11b-11b of FIG. 10. FIG. 12 is a cross-sectional view the blade 42 taken along line 12-12 of FIG. 10. As shown in FIGS. 11(a) and 11(b), a blade thickness L4 of the bottom 42z of each notch 42b in the direction of the thickness of the blade 42 is smaller than a blade thickness L3 of the basic shape section 42c adjacent to the notch 42b.

More specifically, as shown in FIGS. 9 to 12, while the basic shape of the positive pressure surface 42p is unchanged, grooves 42t extending from the inner side of the blade 42 toward the outer side each correspond to one of the notches 42b are formed on the negative pressure surface 42q of the blade 42. Since the grooves 42t are formed on the negative pressure surface 42q, the blade thickness L4 in the vicinity of the bottom 42z in the direction of the thickness of the blade 42 is smaller than the blade thickness L3 of the basic shape section 42c adjacent to the notch 42b. In this manner, the blade thickness L of the cross section along the longitudinal direction of the blade 42 varies.

This configuration reduces the blade thickness of the bottom 42z of each notch 42b. Therefore, as shown in FIG. 13, collision loss at the entry of air flow X into the notches 42b formed at the inner edge 42d is reduced.

Figure 11:
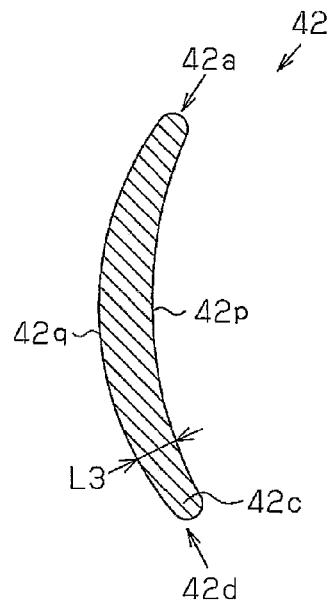
FIG. 11(a) is a cross-sectional view taken along line 11a-11a of FIG. 10.
FIG. 11(b) is a cross-sectional view taken along line 11b-11b of FIG. 10.
Figure 11:
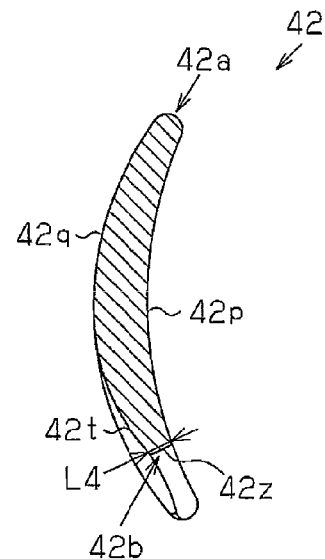
Figure 12:
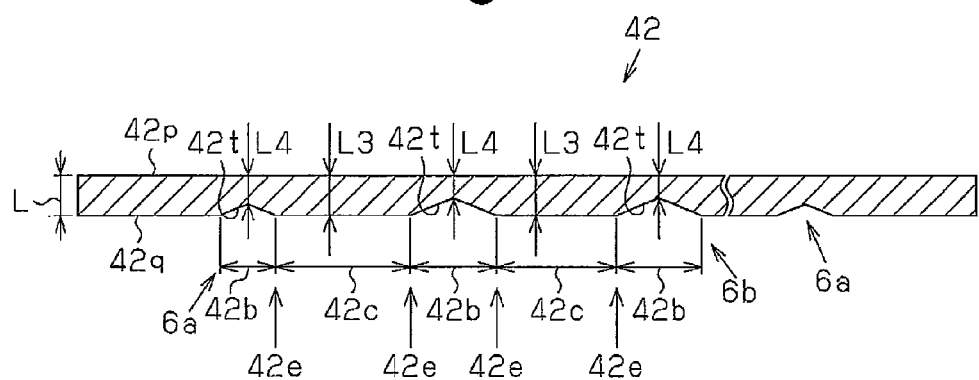
FIG. 12 is a cross-sectional view taken along line 12-12 of FIG. 10.

As shown in FIGS. 9 and 11, a part of the blade 42 that corresponds to the grooves 42t is formed in such a manner that the blade thickness gradually increases from the blade thickness L4, from the bottoms 42z of the notches 42b toward the outer edge 42a. That is, a part that is outside of the groves 42t on the negative pressure surface 42q of the blade 42 and the bottoms 42z of the notches 42b are smoothly connected to each other by the surfaces of the grooves 42t.

As in the first embodiment, each groove 42t is formed to be gradually shallower from the center toward both ends along the longitudinal direction of the blade 42, that is, along the direction of the width of the grooves 42t, or along the rotation axis of the impeller 41, as shown in FIG. 12. In other words, a part of the blade 42 that corresponds to the grooves 42t is formed in such a manner that the blade thickness L gradually increases from the center of each groove 42t toward both ends. Therefore, along the longitudinal direction of the blade 42, no step is formed at the boundary 42e of the groove 42t, and the blade thickness L changes continuously.

The crossflow fan 4 according to the present embodiment has the following advantages.

(5) The blade thickness L4 of the bottom 42y of each notch 42b is smaller than the blade thickness L3 of the basic shape sections 42c. This reduces the collision loss generated when air flow X flows out from inside of the impeller 41 to the notches 42b. As a result, the power output of the electric motor driving the crossflow fan 4 can be reduced compared to the power output of a prior art motor. That is, increase of required motor power output caused by formation of notches is suppressed.

(6) A part of the blade 42 that corresponds to the grooves 42t is formed in such a manner that the blade thickness gradually increases from the blade thickness L, from the bottoms 42z of the notches 42b toward the outer edge 42a. Thus, a part that is outside of the groves 42t on the negative pressure surface 42q of the blade 42 and the bottoms 42z of the notches 42b are smoothly connected to each other by the surfaces of the grooves 42t. This allows the air flow X that flows into the notches 42b from inside of the blade 42 to flow smoothly along the negative pressure surface 42q and out of the impeller 41. This reduces the collision loss generated when air flow X flows from inside of the blade 42 to the notches 42b. As a result, the increase of the power output of the electric motor driving the crossflow fan 4 caused by the formation of the notches in the blades 42 can be effectively reduced.

(7) Each groove 42t is formed to be gradually shallower from the center toward both ends along the longitudinal direction of the blade 42, that is, along the direction of the width of the grooves 42t, or along the rotation axis of the impeller 41. In other words, a part of the blade 42 that corresponds to the grooves 42t is formed in such a manner that the blade thickness L gradually increases from the center of each groove 42t toward both ends. Therefore, along the longitudinal direction of the blade 42, no step is formed at the boundary 42e of the groove 42t, and the blade thickness L changes continuously. Thus, compared to a case where a step is formed at the boundary 42e of the groove 42t, the air flow X flowing out from inside of the blade 42 is disturbed by a less degree. Accordingly, increased power output required from the electric motor for driving the crossflow fan is suppressed further.

(8) The basic shape of the positive pressure surface 42p is maintained, while the grooves 42t are formed on the negative pressure surface 42q. Compared to a case where grooves corresponding to the notches 42b are formed on the positive pressure surface 42p, pressure applied to the air flow X is increased.

Also, the air conditioner of the present embodiment has the crossflow fan 8, which achieves the advantages (5) to (4). The air conditioner therefore achieves the same advantages as the advantages (5) to (8).

The present invention is not limited to the above embodiment, but can be modified in various forms within the spirit of the present invention. The modifications are not excluded from the scope of the present invention. For example, the above embodiments may be modified as follows.

In the first and second embodiments, the notches 42b are formed either at the outer edge 42a or the inner edge 42d of each blade 42. Instead, the notches 42b may be formed at both of the outer edge 42a and the inner edge 42d of the blade 42. According to this configuration, since the notches 42b are formed at both of the outer edge 42a and the inner edge 42d of each blade 42, noise is further effectively reduced. Also, in the inlet region N of the crossflow fan 4, the structure reduces the collision loss generated when air flow X flows in from outside of the blades 42 into the notches 42b, and, in the outlet region M of the crossflow fan 4, the structure reduces the collision loss generated when air flow X flows out from inside of the blades 42 to the notches 42b. Therefore, compared to a case where the notches 42b are formed only at one of the outer edge 42a and the inner edge 42d, the collision loss is reduced while further effectively reducing noise. Thus, increase the increased power output required from the electric motor for driving the crossflow fan 4 is suppressed.

In the above illustrated embodiments, the basic shape of the positive pressure surface 42p is maintained, while the grooves 42t are formed on the negative pressure surface 42q to correspond to the notches 42b. Instead, grooves corresponding to the notches 42b may be formed on the positive pressure surface 42p. In this configuration, the blade thickness L2 (L4) is smaller than the blade thickness L1 (L3). Thus, the advantages (1) to (3) or the advantages (5) to (7) are obtained.

Figure 16:
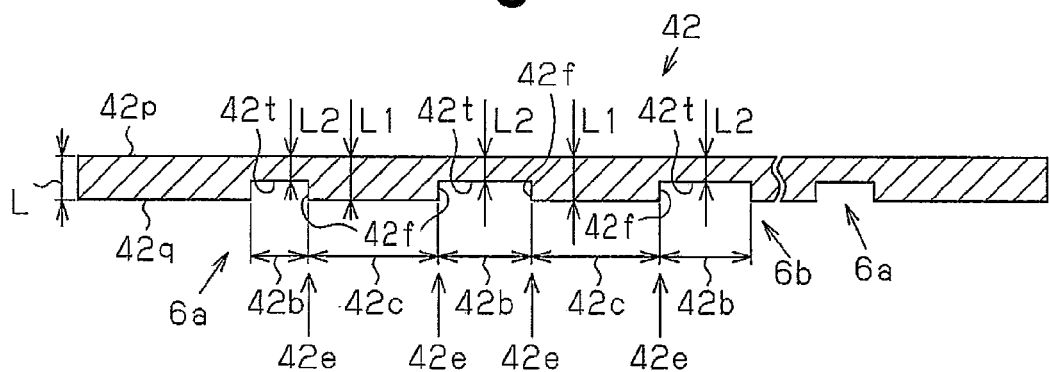
FIG. 16 is a cross-sectional view taken along line 16-16 of FIG. 15.

In the above illustrated embodiments, the notches 42b are V-shaped, and a part of the blade 42 that corresponds to the grooves 42t is formed in such a manner that the blade thickness L gradually increases from the center of each groove 42t toward both ends. Instead, as shown in FIGS. 14 and 15, for example, notches 42b having a rectangular shape as viewed from the negative pressure surface 42q and the positive pressure surface 42p of the blade 42 may be formed at the outer edge 42a, and grooves 42t corresponding to these notches 42b may be formed to extend from the outer side toward the inner side of the blade 42. Cross sectional views taken along lines 5a-5a and 5b-5b of FIG. 15 are the same as FIGS. 5(a) and 5(b). FIG. 16 is a cross-sectional view taken along line 16-16 of FIG. 15. In this case, a part of the blade 42 that corresponds to the grooves 42t does not need to be formed in such a manner that the blade thickness L gradually increases from the center of each groove 42t toward both ends. As shown in FIG. 16, a step 42f may be formed at the boundary 42e between each groove 42t and the adjacent basic shape section 42c. This configuration achieves the above described advantages (1) and (2), or (5) and (6). Further, notches 42b having a rectangular shape as viewed from the negative pressure surface 42q and the positive pressure surface 42p may be formed at the inner edge 42d of the blade 42.

In the above illustrated embodiments, a part of the blade 42 that corresponds to the grooves 42t is formed in such a manner that the blade thickness gradually increases from the blade thickness L, from the bottoms 42y of the notches 42b toward the inner edge 42d. The configuration is not limited to this. That is, the advantage (1) or (5) is achieved as long as the blade thickness L2 in the vicinity of the bottom 42y of the notch 42b is smaller than the blade thickness L1 of the basic shape section 42c. Also, as described above, the notches 42b may be formed on both of the inner and outer sides of the blade 42. That is, the advantages are obtained as long as the notches 42b are formed at at least one of the outer and inner edges of the blade 42, and the blade thickness of the bottom 42y of the notch 42b is less than the blade thickness of the edge of the basic shape section 42c.

A structure for turbulent boundary layer control may be provided on a side of each blade 42 to prevent the boundary layer of air flowing into the blade 42 from separating. The turbulent boundary layer controlling structure is a structure (dimples, grooves, or other rough surfaces) that changes the boundary layer from laminar flow to turbulent flow. If a turbulent boundary layer controlling structure is provided, pressure resistance acting on the blade 42 is reduced, and the power output driving the crossflow fan can be reduced compared to a case where no turbulent boundary layer controlling structure is provided. Particularly, when notches are formed at the outer edge 42a of the blade 42, air flow that has lost its two-dimensionality (that is, an air flow having three-dimensionality) flows into the impeller 41 (in other words, the blade 42). Thus, a turbulent boundary layer controlling structure such as dimples, which have changing cross-sectional shapes along the rotation axis A1 and a direction perpendicular to the rotation axis A1 (that is, two directions perpendicular to each other), or irregular rough surfaces, effectively prevents air flowing onto the blade 42 from separating therefrom.

Figure 17A:
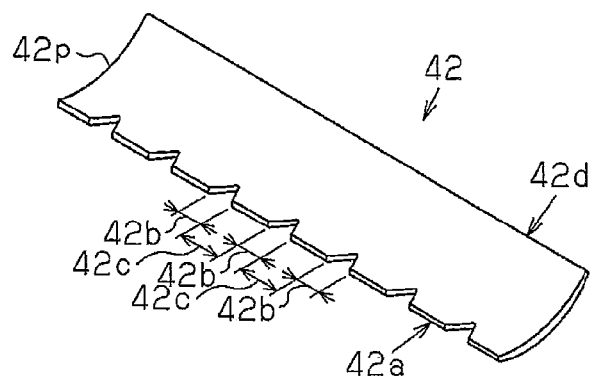
FIGS. 17(a) and 17(b) are perspective views showing an impeller blade of a crossflow fan according to another modified embodiment of the present invention.
Figure 17B:
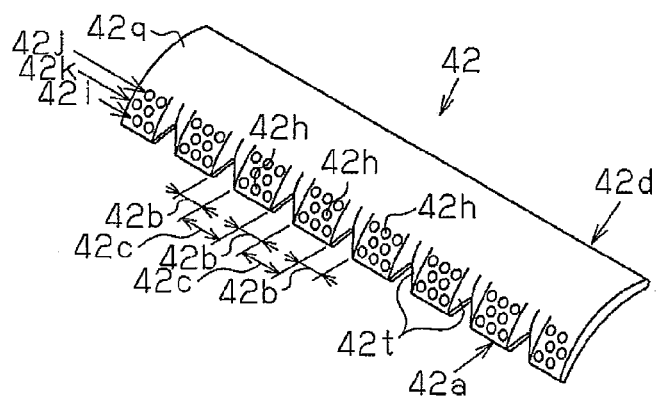

For example, as shown in FIGS. 17 and 18, dimples 42h may be formed on the negative pressure surface 42q of the blade 42. The dimples 42h function as a turbulent boundary layer controlling structure that changes the boundary layer of air flow formed in the vicinity of the negative pressure surface 42q from laminar flow to turbulent flow. The dimples 42h have a predetermined depth and a hemi-spherical bottom. The dimples 42h are formed on the negative pressure surface 42q of the blade 42, in the vicinity of the outer edge 42a, and are arranged along a direction in which air flows. The direction in which air flows on the negative pressure surface 42q of the blade 42 is substantially perpendicular to the rotation axis A1. To ensure sufficient depth of the dimples 42h, the dimples 42h are preferably formed in the basic shape sections 42c formed between the notches 42b.

FIG. 19 is a cross-sectional view taken along line 19-19 of FIG. 18. As shown in FIG. 19, in a case where dimples 42h are formed on the negative pressure surface 42q of the blade 42 along the air flow direction, dimples further away from the outer edge 42a of the blade 42 preferably have smaller depths than those close to the outer edge 42a. That is, the depths of the dimples 42h near the outer edge 42a preferably decrease from the outer edge 42a toward the inner edge 42d. A cross sectional view taken along line 5b-5b of FIG. 18 is the same as FIG. 5(b). The blade thickness L of the blade 42 in a part where the dimples 42h are formed is not included in the blade thickness L1 of the outer edge 42a of the basic shape section 42c. The "depth of dimples" in this description refers to the maximum depth of dimples.

In a case where dimples 42h are formed in three rows along the rotation axis A1 (that is, the longitudinal direction of the blade 42) as shown in FIG. 18, the depths of the dimples 42h in two rows may be the same. Specifically, the depth of the dimples 42j in the third row further away from the outer edge 42a is made smaller than the depths of the dimples 42i, 42k in the other two rows closer to the outer edge 42a, and the depths of the dimples 42i, 42k are equal to each other. That is, only some of the dimples 42h formed in the vicinity of the outer edge 42a may have depths that decrease toward the inner edge 42d. Also, all the dimples 42h may have depths that decrease toward the inner edge 42d. As shown in FIG. 18, the dimples 42k in the second row between the dimples 42i in the third row and the dimples 42j in the third row may be formed at positions displaced along the rotation axis A1 by half the pitch from the dimples 42i, 42j in the other rows.

Figure 20:
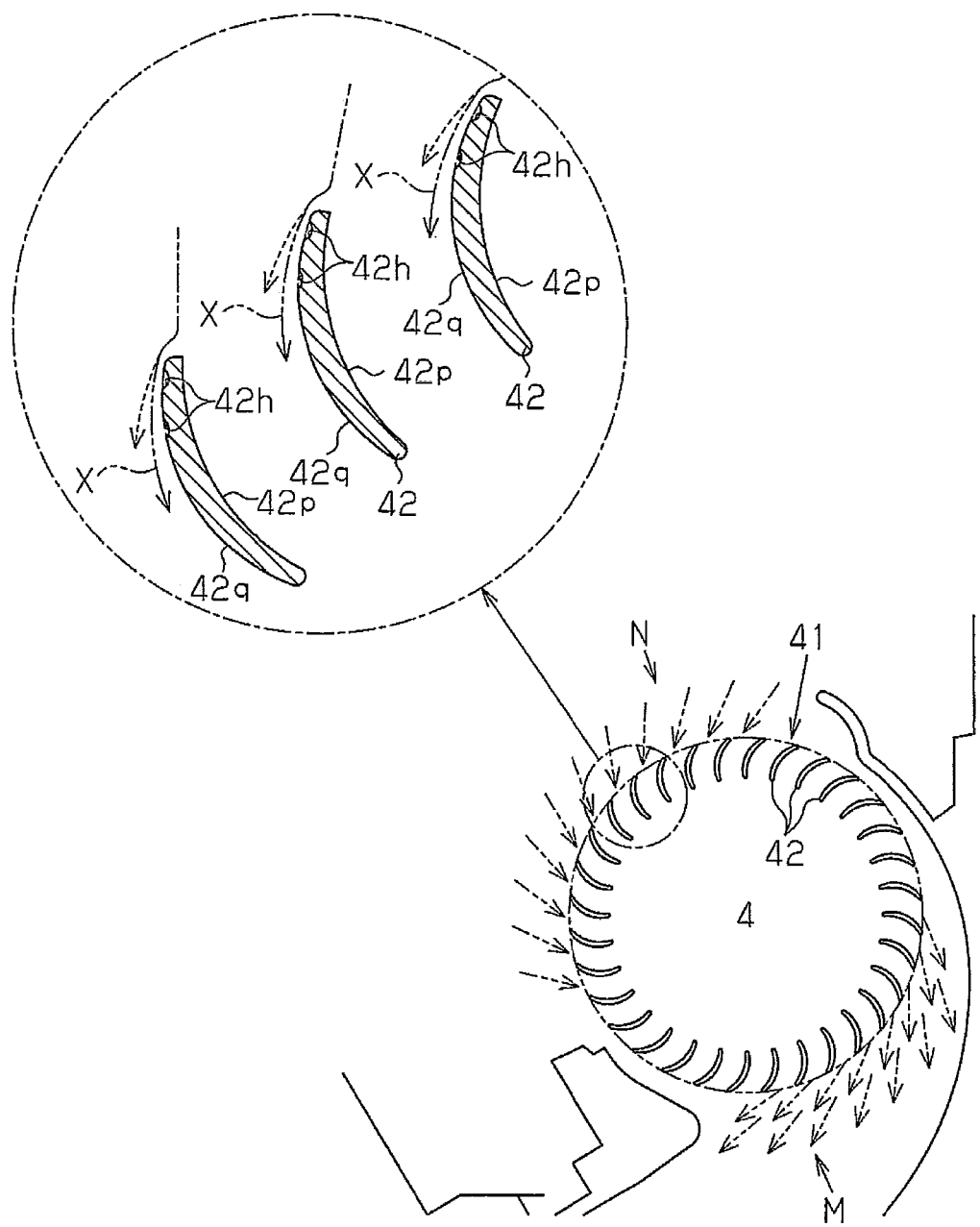
FIG. 20 is a diagram for describing operation of dimples formed on the negative pressure surface of the blade of the modified embodiment of FIG. 17.
Figure 21:
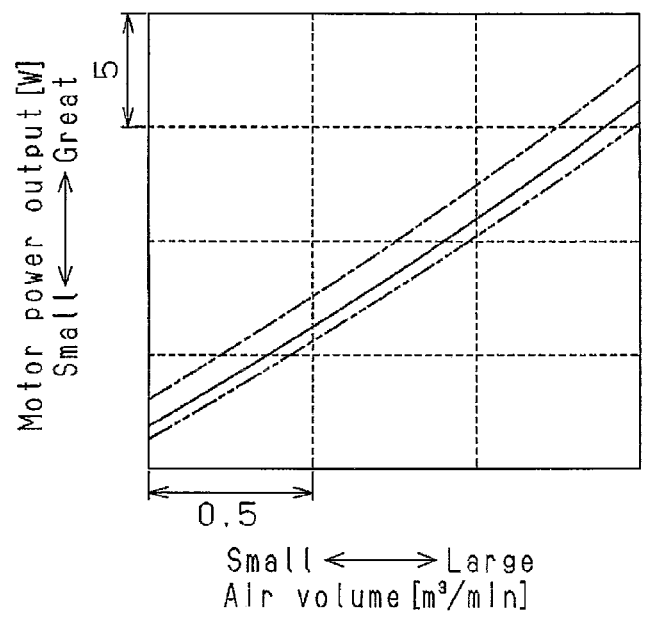
FIG. 21 is a graph for explanatory illustration of the effect of the crossflow fan of the blade of the modified embodiment of FIG. 17.
Figure 22:
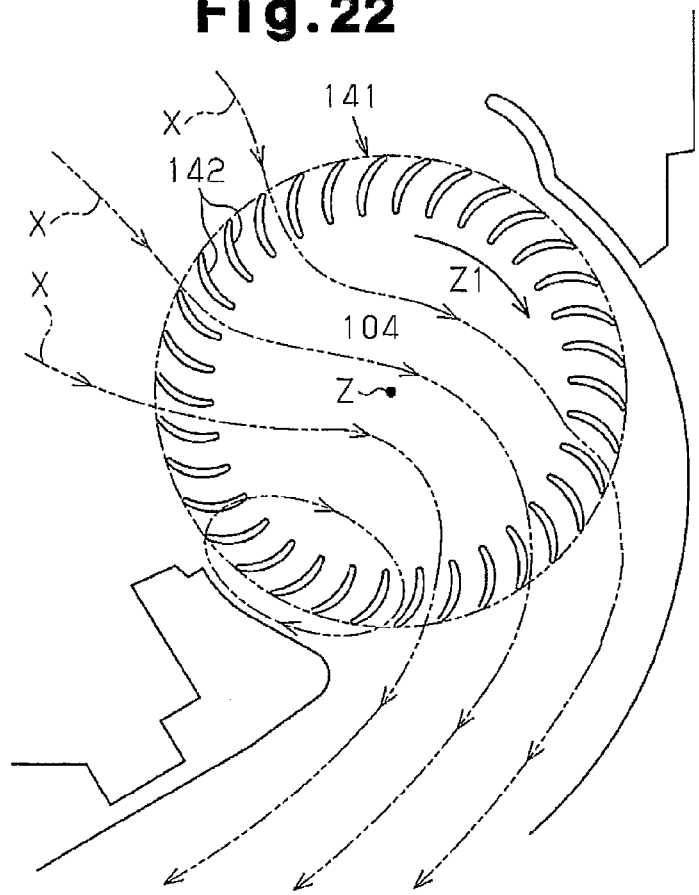
FIG. 22 is a diagram for explanatory illustration of a prior art crossflow fan.
Figure 23A:
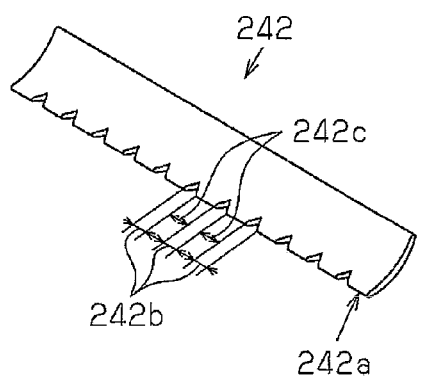
FIGS. 23(a) and 23(b) are perspective views showing an impeller blade of the prior art crossflow fan.
Figure 23B:
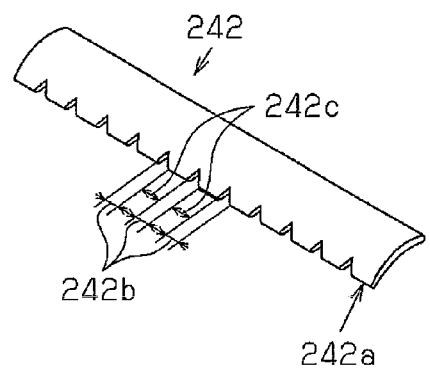
Figure 24:
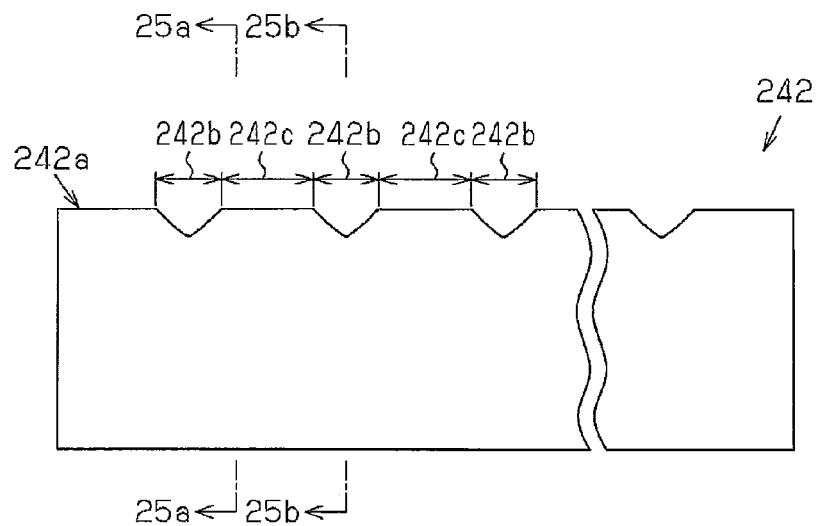
FIG. 24 is a diagram for explanatory illustration of a blade with prior art notches.
Figure 25A:
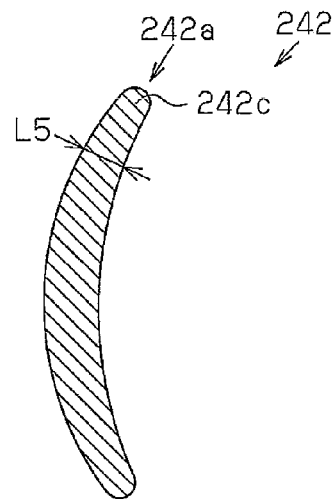
FIG. 25(a) is a cross-sectional view taken along line 25a-25a of FIG. 24.
Figure 25B:
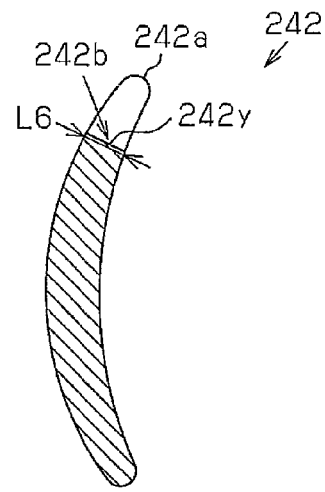
FIG. 25(b) is a cross-sectional view taken along line 25b-25b of FIG. 24.
Figure 26:
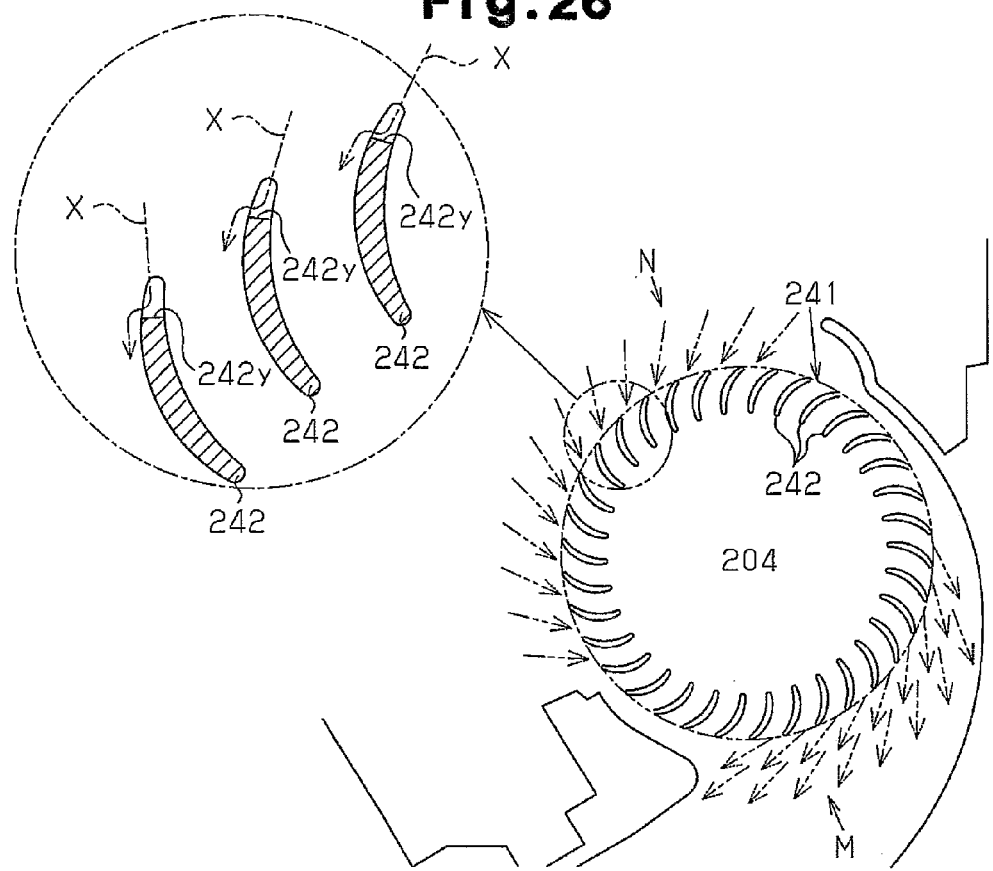
FIG. 26 is a diagram for explanatory illustration of the prior art crossflow fan.

Since the dimples 42h are configured as described above, the boundary layer of air flow in the vicinity of the negative pressure surface 42q of the blade 42 can be changed from laminar flow to turbulent flow. This prevents the air flow at the boundary layer from decelerating, thereby preventing air flow X flowing into the impeller 41 as shown in FIG. 20 from separating from the blade 42. As a result, as shown by the alternate long and two short dashes line in FIG. 21, pressure resistance acting on the blade 42 is reduced, and the power output for driving the crossflow fan can be reduced compared to a case where no dimples 42h are provided (shown by a solid line). In FIG. 20, broken lines show air flow in a case where no dimples 42h are formed. Like FIG. 8, FIG. 21 is a characteristic graph showing the relationship between the air volume and the motor power output. In FIG. 21, the line of a long dash alternating with two short dashes shows the characteristics of the relationship between the air volume and the motor power output in a case where dimples 42h are formed, the solid line shows the characteristics of the relationship between the air volume and the motor power output for the crossflow fan 4 of the first embodiment, and the line of a long dash alternating with a short dash shows the characteristics of the relationship between the air volume and the motor power output for the prior art crossflow fan 204.

In a case where the turbulent boundary layer controlling structure is dimples 42h, the structure effectively prevents air flowing onto the blade from separating compared to a case where the turbulent boundary layer controlling structure is grooves formed along the air flow direction. That is, if the turbulent boundary layer controlling structure is dimples 42h, shearing force produced at the bottom of the boundary layer can be reduced by changing the boundary layer from laminar flow to turbulent flow and creating a secondary flow in the dimples 42h. Therefore, air flowing onto the blade 42 is more effectively prevented from separating from the blade 42.

Particularly, the blade 42 according to the present invention has notches 42b at predetermined intervals. Thus, compared to a case where no notches 42b are formed, the dimples 42h more effectively prevent air flowing onto the blade from separating. That is, in a case where no notches 42b are formed, the edge of the blade is linear and the air flow has a strong two-dimensionality. Therefore, if dimples 42h are formed in a blade with no notches 42b, separation of air flow cannot be sufficiently reduced. In contrast, when notches are formed at an edge of the blade 42, air that flows into the impeller 41 easily enters the notches 42b, which is likely to cause the air flow to lose the two-dimensionality. Therefore, in a case where dimples 42h are formed in a blade having no notches 42b, air flow that has lost the two-dimensionality is effectively prevented from separating from the blade 42.

Since the dimples 42h are formed in the basic shape section 42c between notches 42b, dimples 42h having desired depths are easily formed compared to a case where dimples 42h are formed in the grooves 42t corresponding to the notches 42b. That is, since the blade thickness L of the basic shape section 42c is great compared to the groove 42t, the depths of the dimples 42h can be easily ensured.

Since the depths of the dimples 42h near the outer edge 42a decrease toward the inner edge 42d, the dimples 42j further away from the outer edge 42a of the blade 42 have smaller depths than the dimples 42i closer to the outer edge 42a than the dimples 42j. Development of a boundary layer is not effectively suppressed at the outer edge 42a. As described above, the dimples 42h have different depths. Thus, in dimples 42j further away from the outer edge 42a, loss caused by secondary air flow is reduced. Since the dimples 42j suppress the development of boundary layer by a smaller degree than the dimples 42i closer to the outer edge 42a, the dimples 42h maintain the effect of suppressing the separation of air. Compared to a case where the dimples 42h have the same depths, the power output of the electric motor for driving the crossflow fan can be reduced.

Since the depths of the dimples 42h near the outer edge 42a decrease toward the inner edge 42d, it is easy to form the dimples 42h using a mold (that is, the dimples 42i, 42j, 42k) on the negative pressure surface 42q of the blade 42 along the air flow direction. That is, since the blade 42 is curved, in a case where a single mold is used to form a plurality of blades 42, protrusions (not shown) formed in the mold to form the dimples 42h contact the blade 42, hindering the removal of the blade 42 from the mold when removing the mold after forming the blade 42. However, since the dimples 42j further away from the outer edge 42a have smaller depths than the dimples 42i closer to the outer edge 42a, protrusions in the mold for forming the dimples 42j further away from the outer edge 42a are prevented from contacting the blade 42 when the blade is removed from the mold. As a result, the blade 42 can be easily removed from the mold, and the dimples 42h can be easily formed on the negative pressure surface 42q along the air flow direction.

The case where dimples 42h are formed in the blade 42 according to the first embodiment has been described with reference to drawings. However, dimples 42h may be formed in the blades 42 according to any of the other embodiments described above.

Dimples serving as a turbulent boundary layer controlling structure may be formed on the negative pressure surface 42q of the blade 42 in the vicinity of the inner edge 42d. Alternatively, dimples may be formed in the vicinity of both of the inner and outer edges of the blade 42.

In a case where dimples are formed in the vicinity of the inner edge 42d on the negative pressure surface 42q of the blade 42 along the air flow direction, the depths of the dimples preferably decrease from the inner edge 42d toward the outer edge 42a. That is, in a case where dimples are formed in the vicinity of the inner edge 42d, dimples further away from the inner edge 42d preferably have smaller depths than those close to the outer edge 42a. Specifically, in a case where dimples are formed near both of the inner and outer edges of the blade 42, it is preferable that the depth of dimples near the outer edge 42a become smaller from the outer edge 42a toward the inner edge 42d, and that depth of dimples near the inner edge 42d becomes shallower from the inner edge 42d toward the outer edge 42a.

The invention claimed is:

1. A crossflow fan comprising an impeller having a plurality of support plates located on a rotation axis of the impeller and a plurality of plate-like blades provided at peripheral portions of the support plates, the blades extending parallel to the rotation axis, each blade being inclined such that its outer edge is located on the leading side of its inner edge with respect to the rotation direction of the impeller, one of the faces of each blade that is on the leading side of the rotation direction of the impeller forms a positive pressure surface, the face on the trailing side of the rotation direction forms a negative pressure surface, wherein a plurality of notches are formed at at least one of the inner edge and the outer edge of each blade, the notches being arranged at predetermined intervals along the rotation axis of the impeller, a basic shape section being formed between each adjacent pair of the notches, and a plurality of grooves are formed on one of the positive pressure surface and the negative pressure surface so that a blade thickness in the vicinity of the bottom of each notch is less than a blade thickness of the adjacent basic shape section, and wherein in a longitudinal cross-section of each of the blades, the other of the positive pressure surface and the negative pressure surface, which does not have the grooves, is flat.

2. The crossflow fan according to claim 1,
wherein the notches are formed in the outer edge of each blade,
wherein a plurality of grooves are formed on at least one of the positive pressure surface and the negative pressure surface, the grooves extending from the outer side toward the inner side of the blade and corresponding to the notches, so that the blade thickness in the vicinity of the bottom of each notch is less than the blade thickness of the adjacent basic shape section, and
wherein the blade thickness of a part of the blade corresponding to each groove is gradually increased from the bottom of the notch toward the inner edge of the blade.

3. The crossflow fan according to claim 1,
wherein the notches are formed in the inner edge of each blade,
wherein a plurality of grooves are formed on at least one of the positive pressure surface and the negative pressure surface, the grooves extending from the inner side toward the outer side of the blade and corresponding to the notches, so that the blade thickness in the vicinity of the bottom of each notch is less than the blade thickness of the adjacent basic shape section, and
wherein the blade thickness of a part of the blade corresponding to each groove is gradually increased from the bottom of the notch toward the outer edge of the blade.

4. The crossflow fan according to claim 1, wherein the notches are V-shaped as viewed from the negative pressure surface and the pressure surface of the blade, each groove being formed so as to be gradually shallower from the center toward both sides in the widthwise direction, and the blade thickness continuously changing from the groove toward the adjacent basic shape section.

5. The crossflow fan according to claim 1, wherein the positive pressure surface maintains the basic shape, and the grooves are formed on the negative pressure surface.

6. The crossflow fan according to claim 1, further comprising a structure for turbulent boundary layer control that is provided on the negative pressure surface of each blade, the turbulent boundary layer controlling structure changing boundary layer of air flow formed in the vicinity of the negative pressure surface from laminar flow to turbulent flow, thereby preventing air flowing onto the blade from separating from the blade.

7. The crossflow fan according to claim 6, wherein the turbulent boundary layer controlling structure is provided in the basic shape section formed between the notches.

8. The crossflow fan according to claim 6, wherein the turbulent boundary layer controlling structure includes one or more dimples.

9. The crossflow fan according to claim 8, wherein the dimples are formed in the vicinity of the outer edge of the negative pressure surface of the blade and along a direction of air flow, and the depths of the dimples become shallower from the outer edge toward the inner edge of the blade.

10. The crossflow fan according to claim 8, wherein the dimples are formed in the vicinity of the inner edge of the negative pressure surface of the blade and along a direction of air flow, and the depths of the dimples become shallower from the inner edge toward the outer edge of the blade.

11. An air conditioner comprising the crossflow fan according to claim 1.

* * * * *